US008521217B2

(12) United States Patent
Rodriguez

(10) Patent No.: US 8,521,217 B2
(45) Date of Patent: Aug. 27, 2013

(54) CONTENT SHARING METHODS AND SYSTEMS

(75) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 457 days.

(21) Appl. No.: 12/482,372

(22) Filed: Jun. 10, 2009

(65) Prior Publication Data

US 2010/0317399 A1 Dec. 16, 2010

(51) Int. Cl.
*H04M 1/00* (2006.01)
*G09G 5/00* (2006.01)
*G06K 9/00* (2006.01)

(52) U.S. Cl.
USPC ............. 455/550.1; 455/556.1; 455/556.2; 455/557; 455/90.1; 345/661; 382/100

(58) Field of Classification Search
USPC ............ 382/275, 100; 455/412.2, 556.1, 455/450; 713/2, 176; 358/3.28; 353/101, 353/28, 30; 345/661, 175
See application file for complete search history.

(56) References Cited

U.S. PATENT DOCUMENTS

| | | | |
|---|---|---|---|
| 6,122,403 A | 9/2000 | Rhoads | |
| 6,332,031 B1 | 12/2001 | Rhoads et al. | |
| 6,961,442 B2 | 11/2005 | Hannigan | |
| 6,965,682 B1 * | 11/2005 | Davis et al. | 382/100 |
| 7,010,144 B1 | 3/2006 | Davis et al. | |
| 7,061,510 B2 * | 6/2006 | Rhoads | 345/634 |
| 7,406,214 B2 | 7/2008 | Rhoads | |
| 7,500,758 B1 * | 3/2009 | Adachi et al. | 353/101 |
| 7,505,605 B2 * | 3/2009 | Rhoads et al. | 382/100 |
| 7,515,733 B2 | 4/2009 | Rhoads | |
| 7,536,034 B2 | 5/2009 | Rhoads | |
| 7,587,062 B2 * | 9/2009 | Cornog et al. | 382/100 |
| 7,738,673 B2 * | 6/2010 | Reed | 382/100 |
| 7,874,681 B2 * | 1/2011 | Huebner | 353/28 |
| 8,180,844 B1 | 5/2012 | Rhoads et al. | |
| 2002/0150165 A1 * | 10/2002 | Huizer | 375/240.25 |
| 2002/0176116 A1 | 11/2002 | Rhoads et al. | |
| 2003/0012548 A1 | 1/2003 | Levy et al. | |
| 2003/0038927 A1 * | 2/2003 | Alden | 353/122 |
| 2004/0044894 A1 | 3/2004 | Lofgren et al. | |
| 2005/0213790 A1 | 9/2005 | Rhoads et al. | |

(Continued)

OTHER PUBLICATIONS

Cao et al, Multi-User Interaction using Handheld Projectors, ACM UIST 2007, pp. 43-52.*

(Continued)

*Primary Examiner* — Kent Chang
*Assistant Examiner* — William Lu
(74) *Attorney, Agent, or Firm* — Digimarc Corporation

(57) ABSTRACT

A first device (such as a cell phone) is equipped with a micro-projector, and used to present imagery on a display surface. A second device (such as a second cell phone) is equipped with a digital camera, and used to capture some of the projected imagery. The captured imagery allows a user of the second device to access digital content of interest from a user of the first device, or from elsewhere. The content may be visual, or of other form (content examples include audio, games, maps, text documents, video, spreadsheets, etc.). In one particular arrangement, the projected imagery is encoded with digital watermark data. Through such arrangements, one user can readily share content, and also engage in collaborative activities—such as cooperative game play, with one or more other users.

27 Claims, 2 Drawing Sheets

(56) References Cited

U.S. PATENT DOCUMENTS

| | | | |
|---|---|---|---|
| 2005/0216581 A1 | 9/2005 | Blumenau et al. | |
| 2006/0111967 A1* | 5/2006 | Forbes | 705/14 |
| 2007/0003102 A1* | 1/2007 | Fujii et al. | 382/100 |
| 2007/0052730 A1 | 3/2007 | Patterson et al. | |
| 2007/0070401 A1 | 3/2007 | Okamoto et al. | |
| 2007/0091376 A1* | 4/2007 | Calhoon et al. | 358/3.28 |
| 2007/0181689 A1* | 8/2007 | Kotlarsky et al. | 235/462.11 |
| 2007/0201721 A1* | 8/2007 | Malone et al. | 382/100 |
| 2007/0266252 A1* | 11/2007 | Davis et al. | 713/176 |
| 2008/0049971 A1* | 2/2008 | Ramos et al. | 382/100 |
| 2009/0144534 A1* | 6/2009 | Calhoon et al. | 713/2 |
| 2009/0171930 A1 | 7/2009 | Vaughan et al. | |
| 2010/0017614 A1* | 1/2010 | Russell et al. | 713/176 |
| 2010/0022220 A1* | 1/2010 | Gupta et al. | 455/412.2 |
| 2010/0048242 A1* | 2/2010 | Rhoads et al. | 455/556.1 |
| 2011/0115823 A1* | 5/2011 | Huebner | 345/661 |
| 2011/0122152 A1* | 5/2011 | Glynn et al. | 345/629 |

OTHER PUBLICATIONS

Beardsley, Interactive Projection, Mitsubishi Electric Research Laboratories, Report TR2004-107, Dec. 2005.

Bloom, Security and Rights Management in Digital Cinema, 2003 International Conference on Multimedia and Expo, pp. 621-624.

Digital Cinema Initiatives, LLC, Digital Cinema System Specification, Version 1.2, Mar. 7, 2008.

Garner et al, The Mobile Phone as a Digital SprayCan, ACM ACE Conf, 2006.

Hang et al, Projector Phone—A Study of Using Mobile Phones with Integrated Projector for Interaction with Maps, Mobile HCI 2008.

Hosoi, CoGAME—Manipulation Using a Handheld Projector, ACM SIGGRAPH 2007.

Raskar et al, iLamps—Geometrically Aware and Self-Configuring Projectors, ACM SIGGRAPH 2003.

Search Report and Written Opinion, dated Aug. 19, 2010, in PCT/US2010/038020.

Bell, A Digital Life, Scientific American, Mar. 2007.

Gemmell, MyLifeBits—A Personal Database for Everything, Microsoft Technical Report MSR-TR-2006-23, 2006.

Gemmell, Passive Capture and Ensuing Issues for a Personal Lifetime Store, CARPE '04, pp. 48-55.

* cited by examiner

| USER ID | KEY | CONTENT ID | DATE/TIME |

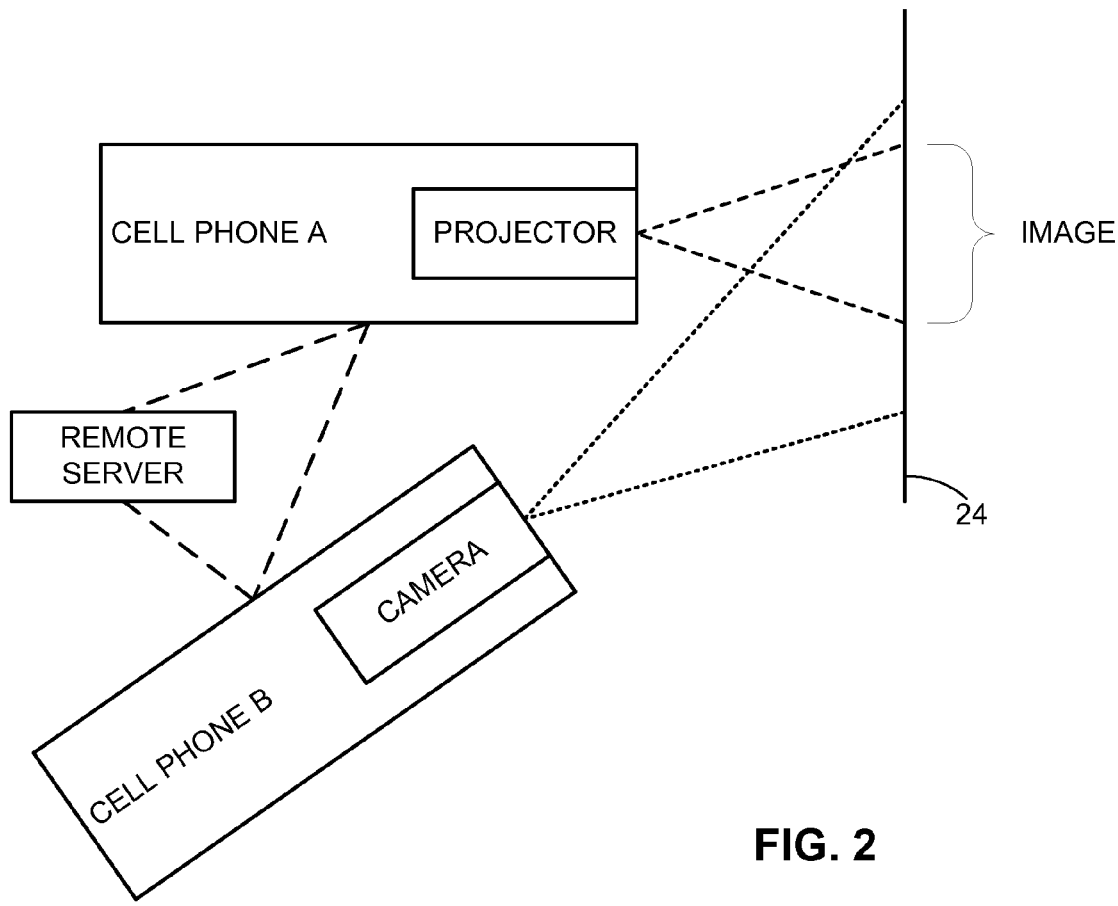

FIG. 2

| UID | ADDRESS |
|---|---|
| 39432 | www.youtube.com/watch?v=dMH0bHeiRNg |
| 45654 | www.flickr.com/photos/macca/32887756/ |
| 74552 | http://phobos.apple.com/WebObjects/MZStore.woa/wa/viewAlbum?selectedItemId=279684960&playListId=279684573&originStoreFront=143441&partnerId=30&siteID=Z3C.fsHC85k-YiA69M9HFSv0vhiqEOXciQ |
| 81102 | www.xerox.com/rochester/PDS/docs/spreadsheet1.xls |
| 92445 | http://media.rockstargames.com/chinatownwars/global/downloads/wallpapers/zhou_ming/zhou_prize.exe |

FIG. 3

CONTENT SHARING METHODS AND SYSTEMS

TECHNICAL FIELD

The present technology relates to pocket projector systems, and methods of their use.

BACKGROUND

Just as a cell phone may have a camera, it may also have a projector. Projectors are being deployed in cell phones offered for sale by CKing (the N70 model, distributed by ChinaVision) and Samsung, while LG and other vendors have shown prototypes.

These projectors are understood to use Texas Instruments electronically-steerable digital micro-mirror arrays, in conjunction with LED or laser illumination.

Microvision offers the PicoP Display Engine, which can be integrated into a variety of devices to yield projector capability, using a micro-electro-mechanical scanning mirror (in conjunction with laser sources and an optical combiner). Other suitable projection technologies include 3M's liquid crystal on silicon (LCOS) and Displaytech's ferroelectric LCOS systems.

BRIEF DESCRIPTION OF THE DRAWINGS

FIG. 2 shows two cell phones, employing certain aspects of the present technology.

FIG. 3 shows a data structure that can be used in certain embodiments of the present technology.

DETAILED DESCRIPTION

Figures 1, 4:
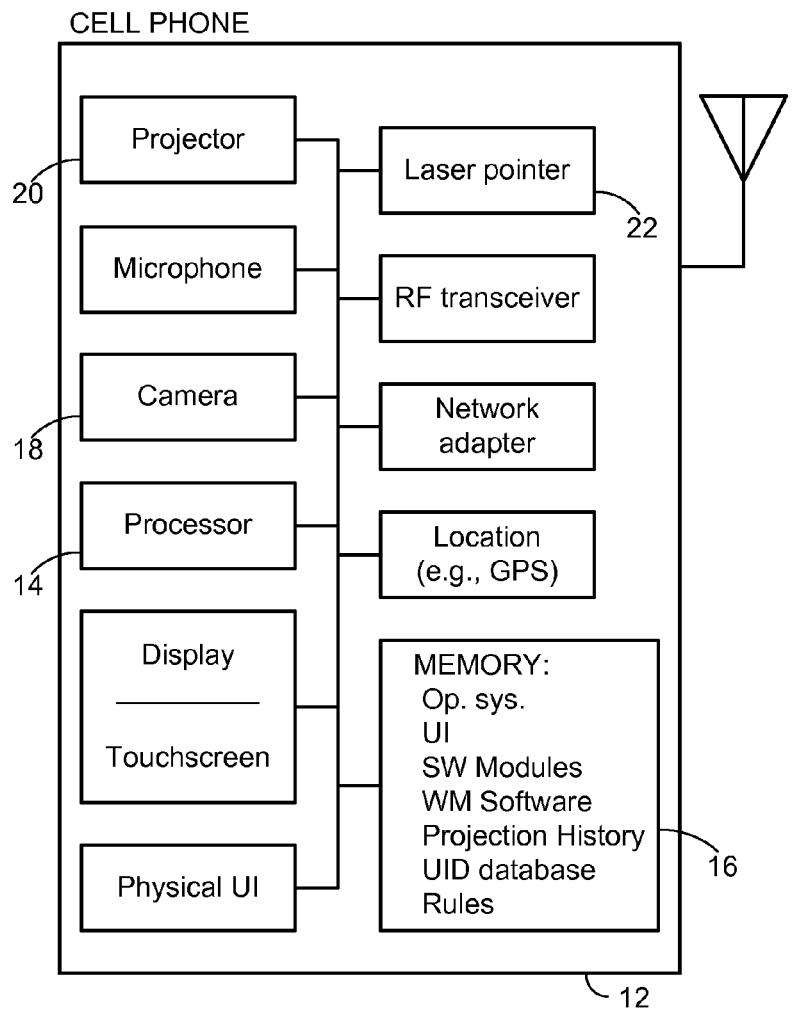
FIG. 1 shows a block diagram of a cell phone embodying certain aspects of the present technology.
FIG. 4 shows a multi-field watermark payload.

As detailed below, certain embodiments of the present technology allow users to share content through means of projectors and cameras. The content may be imagery, but can also include audio, games, maps, text documents, spreadsheets, or any other form of content.

Referring to FIG. 1, an exemplary cell phone 12 includes a processor 14, a memory 16, a camera 18 and a projector 20. A selection of other elements (some of which are optional) are also depicted, such as laser pointer 22. (Since cell phones and associated technology are well known, their conventional features are not belabored. This specification focuses instead on the novel aspects.)

As noted, projectors are being deployed in cell phones by CKing (the N70 model, distributed by ChinaVision) and Samsung, while LG and other vendors have shown prototypes. These projectors are understood to use electronically-steerable digital micro-mirror arrays from Texas Instruments, in conjunction with LED or laser illumination. Microvision offers the PicoP Display Engine, which can be integrated into cell phones to yield projector capability, using a micro-electro-mechanical scanning mirror (in conjunction with laser sources and an optical combiner). Other suitable projection technologies include 3M's liquid crystal on silicon (LCOS) and Displaytech's ferroelectric LCOS systems.

The memory 16 of the depicted cell phone 12 includes a variety of software instructions, and data. The software includes the phone's operating system, together with user interface software. A variety of other software modules are typically provided—some user-selectable (e.g., downloaded from a vendor's application store, such as the Apple AppStore).

Desirably, the software in memory 16 also includes watermark software, such as for embedding a steganographic digital watermark pattern into imagery projected by the cell phone projector 20, and/or for decoding digital watermark data conveyed in imagery captured by the cell phone camera 18. Digital watermark technology is known from Digimarc's patent filings, including patents 6,122,403, 6,307,949, 6,590, 996, and 6,975,744, and pending application Ser. No. 12/337, 029, filed Dec. 17, 2008 (now published as 20100150434).

Turning to FIG. 2, a cell phone "A" uses its projector 20 to present an image on a display surface 24. (The display surface can be essentially anything, including a wall, a person's t-shirt, etc.) A second cell phone "B" uses its camera 18 to capture imagery from a field of view that includes some of the display surface.

The camera's field of view can encompass just a part of the projected image, or it can encompass just the full projected image, or it can encompass the full image and more (as depicted).

The watermark software in cell phone B decodes the digital watermark encoded in the captured imagery. As detailed in the cited patents, the watermark decoding performed by cell phone B may include—as a preliminary process—finding subliminal orientation signals in the captured imagery (e.g., a pattern of spatial frequency domain signals), by which geometrical distortions of the captured imagery from its originally-encoded state can be determined (e.g., scale, rotation, affine transformation). Once this geometrical distortion of the watermark is understood, the watermark decoder in cell phone B extracts a plural-bit watermark payload from the image. The watermark payload can be used by cell phone B to obtain content desired by the user. The content may be obtained from cell phone A, but this is not necessary.

To illustrate, consider that a user of cell phone A is viewing a humorous video clip from YouTube ("The Evolution of Dance"), and wants to share it with friends. The user activates the cell phone projector, and projects the video clip on a wall.

The processor in cell phone A digitally watermarks the projected video with a payload indicating the source of the video. For example, the watermark payload can comprise the YouTube index number for the video (dMH0bHeiRNg), its name (The Evolution of Dance), or its URL (youtube-dot-com/watch?v=dMH0bHeiRNg). (The-dot-convention is used in this specification to prevent the link from being rendered as a live link in electronic presentations of the patent text.)

If one of the viewing friends likes the video, they may use cell phone B to capture a still image, or video clip, from the projected imagery. The watermark decoder software recovers the encoded payload data—desirably (although not necessarily) as soon as the imagery is captured. Cell phone B can auto-retrieve the same content from YouTube, or it can save the payload information in memory, in a historical listing of watermarks decoded from captured content. The user can then employ this information at a later time to obtain a copy of the video clip.

If the watermark payload comprises the full URL, retrieval of the video clip is straightforward. If just the video title, or index number, is provided, then further processing may be required—such as searching YouTube or Google with the payload information. A set of rules stored in cell phone B may establish a protocol of different methods that are to be successively tried to obtain content.

For example, the first rule may be to parse the payload data to see if it appears to be a complete URL. If so, the rule may specify passing the payload to the cell phone browser for loading.

The second rule may be to look for data looking like a YouTube index number. This check can comprise seeing if the payload is between 10 and 12 symbols, and includes a capital letter following a lower case letter. If so, the cell phone processor can create a full URL by pre-pending the symbols "www-dot-youtube-dot-com/watch?v=" to the payload, and pass it to the cell phone browser for loading.

The third rule may be to check if any of the payload appears to be a word, such as by checking a dictionary database. If so, the cell phone processor can instruct the browser to search Google's web index for the payload as a text phrase. Hopefully, the desired content will be listed near the top of the Google search results, and the user can select same to load.

In other embodiments, the payload encoded into the projected imagery by cell phone A is an arbitrary identifier, such as a unique ID (UID). Cell phone A can write an entry to a data structure (e.g., a table) that associates the UID with information about the content—such as address information detailing where the content can be obtained. When cell phone B decodes this identifier, it can consult the same data structure—using the UID to access the corresponding address information. (The data structure may be in the memory of cell phone A, or it can be elsewhere, e.g., in a remote computer server—as depicted in FIG. 2. In the former case it may be accessed by cell phone B using technology such as a Bluetooth link. In the latter case, it may be accessed by cell phone B over the internet.)

An exemplary data structure is shown in FIG. 3, and serves to associate UIDs conveyed by projected watermarks with corresponding address information. Shown are links to YouTube, Flickr, Apple, Xerox, and Rockstar Games.

The Apple link is actually a link to a song at the Apple iTunes store. This illustrates that the content to be shared need not be visual content. The music player application on cell phone A (e.g., iTunes) may present a graphic (e.g., an album cover) or an animation whenever music is played. Cell phone A can encode the presented imagery with a watermark encoding a UID that points (through the FIG. 3 table) to a source of the music—in this case to the iTunes store.

Similarly, the Xerox link is a link to an Excel spreadsheet on a Xerox server. Again, cell phone A can encode projected imagery with a UID that points to a data structure record indicating where the displayed document can be found.

In this case, as in others, access to the document may be protected from unlimited public access, such as by an encryption key, or an access password. The watermark payload encoded by cell phone A can include a portion (e.g., a field) that allows the user of cell phone B to access the indicated content from the protected website.

(A variety of such protection techniques are known, so are not belabored here—except to note that certain implementations of this sharing mechanism can restore an "analog" trait of sharing that has been largely lost in other digital content systems. Specifically, cell phone A may use a payload that requires routing—such as resolving the UID into associated URL information. However that UID may need to be resolved each time in order to retrieve the content, allowing the owner of cell phone A to retain control over the material, restricting sharing so that only one person at a time can have "it," similar to a physical object. Or, it might limit the person with cell phone B to project the content but not pass it on (e.g., because that second recipient is not granted access to the routing table), etc. Thus, there is an element of DRM that can be inherent in certain implementations of content sharing.)

The Rockstar Games link relates to the game Grand Theft Auto—Chinatown Wars. In particular, the user of cell phone A may have reached an unusually high level while playing the game on the phone and projecting the game display, and gained access to features with online counterparts. The encoded link information gives the user's friend access to that same special online content (or to an archive of the game as-played, or to executable game software, etc.).

In other arrangements, the watermark payload embedded in the projected display is a time/date stamp. Cell phone A can maintain a history file detailing all of the content it processes and/or projects, as a function of date/time. When cell phone B captures imagery projected from cell phone A, it can consult the history file (immediately, or later) to obtain information related to the content displayed by cell phone A at the date/time indicated by the decoded watermark data. (Like FIG. 3, the history file can be in table form, and can be stored on cell phone A, or remotely.)

While the data structures in the foregoing arrangements store pointers to corresponding content data, in other embodiments the data structure can store the corresponding content data itself. For example, whenever cell phone A projects information using the projector, it may simultaneously write the same information to a data store, where that content can be accessed by others.

(Such an arrangement is somewhat related to the work of Gordon Bell at Microsoft, who seeks to create a digital archive of his life—logging data from audio, video and other sensors capturing his environment. Included in Bell's archive are recordings of all telephone calls, video of daily life, captures of all TV and radio consumed, archive of all web pages visited, map data of all places visited, polysomnograms for his sleep apnea, etc., etc., etc. However, instead of logging incoming content, the projection device in such embodiment logs outgoing content.)

In still other embodiments, the watermark payload can include multiple fields—including one identifying the projecting cell phone (or its user). FIG. 4 shows one such multi-field watermark payload. A first field is an identifier associated with the user (e.g., by reference to a data structure that associates a numeric identifier with textual identification information); the second field is a key permitting access to online content; the third is an identifier of content (e.g., a URL or otherwise); the fourth is data indicating the date/time of projection.

In embodiments including a user ID (e.g., a cell phone serial number), this encoding may be static throughout the life of the phone. In such case, an optical encoder—such as a film in the projection path, patterned with a subtle pattern encoding a user ID watermark, can be employed. Additional fields of the watermark can be encoded by electronically processing the image data prior to projection.

It will be recognized that aspects of the technology detailed above facilitate sharing and viral distribution of content among and between groups of users. The content may—but need not—be visual; watermarked pixels can serve as a proxy for any other form of data.

Another usage model includes collaboration, in which cell phone B projects imagery—on top of or adjacent to the imagery projected from cell phone A—so as to create a visual collaboration. Applications include the creation of collaborative works, such as drawings, where each user—using their cell phone's UI (buttons, keys, touch-screen, proximity sensor, accelerometer, etc.)—controls a drawing application, using typical tools such as a paintbrush or eraser, to draw in the in the shared projected space. Facilitating the collaboration is that each device separately watermarks its contribution to the projected image, providing linkage to data structures that are accessible (via Bluetooth, internet, etc.) and that describe the session and the objects being drawn. Many cell phones—including A and B, as well as others, can participate in the drawing session, either actively, or passively—as an observer only.

A simple illustration of such collaboration is a user of cell phone A drawing a circle (e.g., using the Microsoft drawing application Visio) and projecting the drawing using the projector. The user of cell phone B, operating that phone's UI, then "grabs" a control point at the perimeter of the projected circle (e.g., using control points presented by Visio), and distorts the circle into an ellipse. (Some embodiments have the ability to both project imagery onto, and sense imagery from the same display surface 24 simultaneously, or in quickly alternating, synchronized fashion; other embodiments do not.)

To grab a control point of the projected circle, the user of cell phone B positions the camera so that the control point is at the center of the camera's field of view, and then operates a control on the phone's UI—like activating a mouse button. Once grabbed, the user of cell phone B operates the cell phone to indicate the position to which the edge of the circle is to be stretched. This may be done by holding the control while moving the phone so that the center of the camera's field of view is located at a position corresponding to the desired distortion of the circle (as is familiar from Visio). The user then releases the control.

In one particular embodiment, cell phone B communicates the new edge position of the circle to cell phone A by transmitting {x,y} position data for the point originally grabbed, and {x,y} position data for the point's ending location. This position data is expressed in terms of the frame of reference defined by the orientation signal encoded in the original projected image by cell phone A (e.g., with the upper left corner being the origin), such as a number of projected pixels to the right and down. Communication can be by Bluetooth or otherwise.

To facilitate such operation, the center of the field of view of the camera in cell phone B can be denoted by a cross-hair overlaid on the screen of camera B that shows the imagery being captured by the phone's image sensor. (In other embodiments, other positions can be used; use of the center of the field of view is not critical.)

In other arrangements, cell phone B may project a pointer spot—which may be a laser point or otherwise—to indicate a particular location to be "grabbed," and a particular end location after stretching. The camera in cell phone A may sense these markings, and update the projected Visio drawing accordingly. (The pointer spot may have two modes, tracking and clicking. In tracking mode the pointer is visible, but no responsive action is taken. In clicking mode, the pointer momentarily signals to a responsive camera system that an action is to be taken based on the current location of the pointer spot. This can be signaled by changing the color of the spot, by modulating its amplitude with a distinctive temporal pattern, or otherwise. In still other arrangements, the pointer spot is unchanging, but the pointer mode is indicated by another data channel, such as a Bluetooth broadcast from cell phone B.

In still another arrangement, cell phone B decodes the watermark encoded by cell phone A in the projected circle drawing. The payload of this watermark may convey the name of the Visio file on cell phone A, or a pointer to the file. Cell phone B uses this payload data to obtain a copy of the drawing file. The user of cell phone B then manipulates the drawing copy, e.g., stretching it into an ellipse. Cell phone B projects its revised image for review by the user of cell phone A. The user of cell phone A can likewise capture the revised drawing image projected by cell phone B and decode the watermark encoded into it by cell phone B. Using this information, cell phone A can obtain a copy of the edited drawing file, e.g., from cell phone B. It can load the edited version, make a further proposed edit, and project the twice-edited version. Edits can ping-pong back and forth, with each cell phone processor running Visio and loading successively-edited versions of drawings.

In a variant, the drawing program is not resident on the cell phones, but rather is a cloud-based application, to which both cell phones have access. In this case the data files need not be exchanged between phones. They can be stored remotely (in the cloud) too. Or, the cloud application can support multiple users editing a single drawing file.

Any usage scenario that supports or requires collaboration can be facilitated in such manner. Other examples include multiple individuals having an ad-hoc jam session—creating scores and drum tracks that are played back on one or more devices; gaming, e.g., with multiple drivers in a race car game; multi-user war games where "mercenaries" can join ad-hoc groups of gamers in the high-school lunchroom, etc.

It should also be noted that the participation in a session need not require cell phone B to project on top of cell phone A's image at all times. Simultaneous projection may occur just when cell phone B enters the session (akin to logging-in), after which that user may participate in the session without the projector, shaking their cell phone as a maraca, strumming the guitar application from the iTunes store, etc. The session may continue even if the user is no longer in proximity of the cell phone user A, yet may continue to participate in a game, etc.

Collaboration may also occur with streaming content, such as where cell phone A is projecting a sporting event and cell phone B is projecting stats or historical information about the team or potentially an individual player during the game. The information may track with the individual players or event occurring.

Many such arrangements are enabled by the ability to project imagery from multiple vantage points that are "rectified" against other images. As noted, this can be accomplished by utilizing a common orientation signal projected by cell phone A, which provides a common origin for all devices participating in the session. This orientation signal can be provided through the use of the noted digital watermarking technologies and/or overt symbologies or explicit fiducials.

Note that any simultaneous (or alternating) image projections by both cell phones A and B will commonly overlap, but need not. The common reference frame established by orientation signals can be used even if the projections do not overlap.

Having described and illustrated the principles of the technology with reference to various implementations, it should be recognized that the technology is not so limited.

For example, while the specification has detailed certain information as being stored in certain locations, and certain processing taking place in certain devices, this is exemplary only. Data can be stored anywhere, and processing can take place anywhere—with information being exchanged between devices as may be required by the application.

While this specification frequently uses the term "cell phone," this term is meant to be given a broad meaning and includes phones of various descriptions—including WiFi phones and others that may not—strictly speaking—use a "cell" network. The Apple iPhone is one example of a cell phone. (Details of the iPhone, including its touch interface, are provided in published patent application 20080174570.) Another is the T-Mobile G1, manufactured by HTC—one of the Android phones. Other personal digital assistant devices, which may include the functions of a computer, a music player, a projector and/or a camera, etc., are also meant to be encompassed by the term "cell phone" as used in this specification—even if "phone" functionality is not provided.

The watermark encoder software in cell phone A can run continuously—marking all content presented by the cell phone (whether presented on the built-in display, or projected by a projector). Alternatively, the encoder may be activated selectively, such as when the projector is activated.

In like fashion, the watermark decoder in cell phone B can run whenever the device is processing image or video information, or only selectively (such as when the user activates a control).

The watermarking technology noted above is exemplary only; a great many other watermarking technologies can be employed, including those commercialized by Philips (now Civolution) and Thomson. Examples are shown in U.S. Pat. Nos. 5,933,798, 6,577,747, 6,671,388, 6,782,116, 7,031,492 and 7,191,334. (Although a video watermark can be used, applicant prefers a still image watermark—to avoid temporal dependencies.) In still other arrangements, the projected content can be identified by deriving a "fingerprint" from the captured pixels, and identifying a corresponding record in a data structure—as detailed, e.g., in published patent documents 20070174059 (Digimarc), 20070253594 (Vobile), 20080317278 (Thomson) and 20050141707 (Philips/Gracenote).

In the detailed arrangements, the projected content is watermarked by cell phone A according to a stored rule set. For example, content downloaded from the web may be encoded with the URL from which it was fetched; game displays may be encoded with the game name and level number; camera images earlier captured and stored on the cell phone may be encoded with the image file names, etc. In other arrangements, the user of cell phone A is given control over the watermark payload. The user can summon a UI that presents a menu of possible payloads with which projected content can be encoded. For example, a user may selectively instruct that album art projected during playback of a song be encoded with (i) a link to the song on iTunes; (ii) a link to the song on Amazon; (iii) a link to the top-ranked music video of that song on YouTube; (iv) a link to a shared library of MP3 song data stored on cell phone A (including the song being played back and others), etc.

While in the detailed arrangement, cell phone A watermarks the projected content, in other arrangements the content may have been earlier watermarked. For example, most television in the US is digitally watermarked by encoding equipment at broadcasting stations, which embeds a source ID (e.g., WABC) and a timestamp. These encoders are part of a network employed by The Nielsen Company to help track television consumption. Nielsen maintains a database that details the program lineup for each channel in each geographic market and national network, by date and time. This database is fed by program guide information compiled by vendors such as Tribune Media Company and/or TV Guide. To identify a program from a watermark, cell phone B can submit the decoded source ID/time stamp information to the database, which returns data identifying the program. In like fashion, YouTube and other content distributors can similarly watermark their content before it is provided to cell phone A.

It is envisioned that the above processes, systems and system components can be implemented in a variety of computing environments and devices. The depicted cell phones and remote server computer are exemplary only. It is specifically contemplated that the processes and components can be implemented within devices and across multiple devices.

Suitable computing environments encompass a broad range, from general purpose programmable computing devices, to specialized circuitry, and arrangements including a combination of both. The processes and system components may be implemented as instructions for computing devices, including general purpose processor instructions for a variety of programmable processors, including microprocessors, digital signal processors, etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processor and/or made parallel across processors within a device or across a network of devices. Transformation of content signal data may also be distributed among different processor and memory devices.

Each computing device includes, as necessary, one or more processors, one or more memories (including computer readable media), input devices, output devices, and communication among these components (e.g., a bus). Communication between devices can be wired, but is more typically wireless (e.g., WiFi, WiMax, Bluetooth, etc.) For software/firmware, instructions are read from computer readable media, such as optical, electronic or magnetic storage media via a communication bus, interface circuit or network and executed on one or more processors.

The above processing of content signals includes transforming of these signals in various physical forms. Imagery and video (forms of electromagnetic waves traveling through physical space and depicting physical scenes) are captured from physical objects using cameras or other capture equipment. While these signals are typically converted to and processed in electronic and digital form to implement the components and processes described above, they may also be captured, processed, transferred and stored in other physical forms, including electronic, optical, magnetic and electromagnetic wave forms. The content signals are transformed during processing to encode and decode watermark information, including writing and reading various data structure representations information as explained above. In turn, the data structure signals in memory are transformed for manipulation during indexing, reading, writing, loading, etc.

To provide a comprehensive disclosure without unduly lengthening this specification, applicant incorporates by reference the patent documents referenced above.

I claim:

1. A portable device comprising a processor coupled to a memory and to a projector, the memory including instructions executed by the processor to enable the portable device to project items of content using the projector, the memory further including instructions executed by the processor to store data corresponding to projected items of content in a data log, said data log serving to identify historical content projected by the portable device, wherein the data log includes first and second data, the first data identifying content obtained by the device from a remote computer device, and the second data identifying content not obtained by the device from a remote computer device, and wherein the memory further includes instructions executed by the processor to encode a plural-bit steganographic digital watermark payload into at least certain of said projected items of content, said payload identifying the portable device.

2. The portable device of claim 1, wherein the portable device comprises a cell phone device.

3. A non-transitory computer readable medium having instructions stored thereon that, if executed by a projector-equipped device, cause the device to perform operations including:
receive a first item of content captured using a camera portion of said device, or created in accordance with instructions of a user;
receive a second item of visual content from a remote computer device;
encode a plural-bit steganographic digital watermark payload into at least one of the items of content, said payload identifying the device;
project the first and second items of content; and
store data corresponding to the projected first and second items of content in a data log, said data log serving to identify historical content projected by the projector-equipped device.

4. The medium of claim 3 wherein said instructions further cause the device to encode a plural-bit steganographic digital watermark payload into at least certain of said projected items of content, said payload identifying the device.

5. The medium of claim 3 wherein said instructions cause the device to receive, as the first item of content, content captured using a camera portion of said device.

6. The medium of claim 3 wherein said instructions cause the device to receive, as the first item of content, content created in accordance with instructions of a user.

7. The medium of claim 3 wherein said instructions cause the device to store said data in a memory remote from the projector-equipped device.

8. The medium of claim 3 wherein said instructions cause the device to store said data in a memory of the projector-equipped device.

9. The medium of claim 3 wherein said stored data comprises the projected first and second items.

10. A method comprising:
encoding a plural-bit steganographic digital watermark payload into image data using a processor in a cell phone, the payload identifying the cell phone; and
projecting the encoded image data onto a display surface, using an optical projector in said cell phone, said projecting comprising projecting plural items of content for display from the cell phone projector, one of said projected items comprising first imagery corresponding to image data obtained by the cell phone from a remote computer device, another of said projected items comprising second imagery that does not correspond to image data obtained by the cell phone from a remote computer device, at least one of said first or second items of imagery comprising said image data processed by said encoding act; and
storing data corresponding to both of said items in a data log, said data log serving to identify historical content projected from the cell phone.

11. The method of claim 10 in which the stored data comprises the projected first and second imagery.

12. The method of claim 10 in which the first imagery comprises video content obtained from an online web service, and the second imagery comprises output information produced by an application program responsive to instructions from a user of the cell phone.

13. The method of claim 12 in which the application program comprises a drawing program.

14. The method of claim 10 in which the second imagery comprises camera imagery earlier captured and stored on the cell phone.

15. The method of claim 10 that includes storing said data in a memory of the cell phone.

16. The method of claim 10 that includes storing said data in a memory remote from the cell phone.

17. The method of claim 10 that includes storing said data in a memory remote from the cell phone, from which the stored data can be accessed by a user other than a user of the cell phone.

18. The method of claim 10 that includes encoding a plural-bit steganographic digital watermark payload into at least one of said projected items.

19. A method comprising the acts:
encoding a plural-bit steganographic digital watermark payload into image data using a processor in a cell phone, the payload identifying the cell phone; and
projecting the encoded image data onto a display surface, using an optical projector in said cell phone;
wherein:
said encoding comprises encoding said plural-bit steganographic digital watermark payload into first and second items of content; and
said projecting comprises projecting the encoded first and second items of image data onto the display surface using said optical projector in the cell phone;
and wherein the method further comprises:
storing data corresponding to both of said first and second items of content in a data log, said data log serving to identify historical content projected from the cell phone;
wherein the first item of content corresponds to image data obtained by the cell phone from a remote computer device, and the second item of content does not correspond to image data obtained by the cell phone from a remote computer device.

20. The method of claim 19 that includes the cell phone logging the identity of the projected image data in a historical data store, as the cell phone is projecting the image data onto the display surface, so that a viewing device can decode the watermark payload and access the projected image data from said data store.

21. The method of claim 19 wherein the payload comprises plural data fields, one of said fields identifying the cell phone, another field communicating a key that permits access to online content, another field conveying an identifier of content, and another field indicating a date and time of said projecting.

22. The method of claim 19 in which the payload includes two or more data fields, one of said data fields conveying a key permitting access to online content.

23. The method of claim 22 in which another of said data fields conveys an identifier of content.

24. The method of claim 22 in which another of said data fields conveys data indicating a date or time of projection.

25. The method of claim 19 in which the payload includes two or more data fields, one of said data fields conveying an identifier of content.

26. The method of claim 25 in which another of said data fields conveys data indicating a date or time of projection.

27. The method of claim 26 in which another of said data fields conveys a key permitting access to online content.

* * * * *